United States Patent
Resch et al.

(10) Patent No.: US 10,514,971 B2
(45) Date of Patent: *Dec. 24, 2019

(54) DISPERSED B-TREE DIRECTORY TREES

(71) Applicant: International Business Machines Corporation, Armonk, NY (US)

(72) Inventors: Jason K. Resch, Chicago, IL (US); Wesley B. Leggette, Chicago, IL (US); Andrew D. Baptist, Mt. Pleasant, WI (US); Ilya Volvovski, Chicago, IL (US); Greg R. Dhuse, Chicago, IL (US)

(73) Assignee: PURE STORAGE, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/193,328

(22) Filed: Nov. 16, 2018

(65) Prior Publication Data
US 2019/0087262 A1 Mar. 21, 2019

Related U.S. Application Data

(63) Continuation of application No. 16/047,637, filed on Jul. 27, 2018, now Pat. No. 10,169,129, which is a (Continued)

(51) Int. Cl.
*G06F 11/07* (2006.01)
*G06F 11/10* (2006.01)

(52) U.S. Cl.
CPC ...... *G06F 11/0757* (2013.01); *G06F 11/0727* (2013.01); *G06F 11/1076* (2013.01); *G06F 2211/1028* (2013.01)

(58) Field of Classification Search
None
See application file for complete search history.

(56) References Cited

U.S. PATENT DOCUMENTS

| 4,092,732 A | 5/1978 | Ouchi |
| 5,255,387 A | 10/1993 | Arnold et al. |

(Continued)

OTHER PUBLICATIONS

Chung; An Automatic Data Segmentation Method for 3D Measured Data Points; National Taiwan University; pp. 1-8; 1998.
(Continued)

*Primary Examiner* — Tracy C. Chan
(74) *Attorney, Agent, or Firm* — Garlick & Markison; Shayne X. Short

(57) ABSTRACT

A computing device includes an interface configured to interface and communicate with a dispersed storage network (DSN), a memory that stores operational instructions, and processing circuitry operably coupled to the interface and to the memory. The processing circuitry is configured to execute the operational instructions to perform various operations and functions. The computing device obtains directory metrics associated with a directory structure that is associated with a directory file that is segmented into a plurality of data segments and based on a determination to reconfigure the directory structure based on the directory metrics, the computing device determines a number of layers for a reconfigured directory structure, a number of spans per layer of the number of layers for the reconfigured directory structure, and directory entry reassignments. The computing device reconfigures the directory structure based on the number of layers, the spans per layer, and the directory entry reassignments.

20 Claims, 7 Drawing Sheets

Related U.S. Application Data continuation-in-part of application No. 13/372,748, filed on Feb. 14, 2012, now abandoned.

(60) Provisional application No. 61/448,526, filed on Mar. 2, 2011.

(56) References Cited

U.S. PATENT DOCUMENTS

| | | |
|---|---|---|
| 5,454,101 A | 9/1995 | Mackay et al. |
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,918,229 A * | 6/1999 | Davis .................. G06F 9/5016 711/147 |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 * | 4/2004 | Basani ................ H04L 67/1095 707/999.01 |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 * | 9/2007 | Sim .................... H04L 67/1008 709/223 |
| 7,636,724 B2 | 12/2009 | de la Torre et al. |
| 9,043,637 B2 * | 5/2015 | Saika .................. G06F 11/1417 714/6.1 |
| 9,716,769 B2 * | 7/2017 | O'Connell, Jr. .... H04L 61/1582 |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2003/0236950 A1 | 12/2003 | Clarke et al. |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma |
| 2005/0055529 A1 * | 3/2005 | Lubbers ............... G06F 16/10 711/203 |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula |
| 2005/0132070 A1 | 6/2005 | Redlich et al. |
| 2005/0144382 A1 | 6/2005 | Schmisseur |
| 2005/0229069 A1 | 10/2005 | Hassner et al. |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters et al. |
| 2009/0094251 A1 | 4/2009 | Gladwin et al. |
| 2009/0094318 A1 | 4/2009 | Gladwin et al. |
| 2009/0164737 A1 | 6/2009 | Deshpande et al. |
| 2010/0023524 A1 * | 1/2010 | Gladwin ............... G06F 3/0617 707/E17.032 |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association or Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): String Representation of Search Filters; IETF Network Working Group; RFC 4515; Jun. 2006; pp. 1-12.

Smith; Lightweight Directory Access Protocol (LDAP): Uniform Resource Locator; IETF Network Working Group; RFC 4516; Jun. 2006; pp. 1-15.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Working Group; RFC 4518; Jun. 2006; pp. 1-14.

(56) References Cited

OTHER PUBLICATIONS

Zeilenga; Lightweight Directory Access Protocol (LDAP): String Representation of Distinguished Names; IETF Network Working Group; RFC 4514; Jun. 2006; pp. 1-15.

* cited by examiner

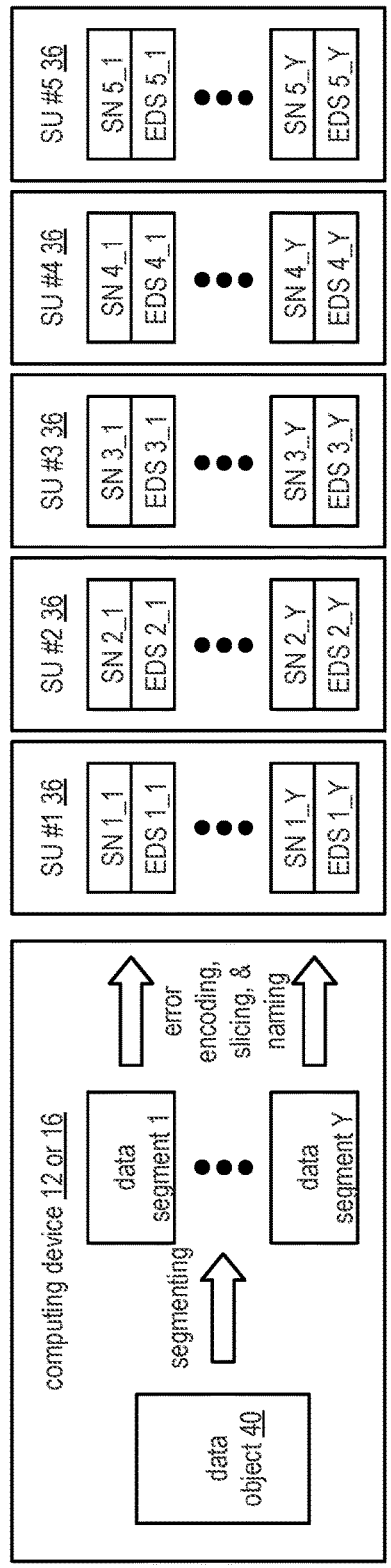
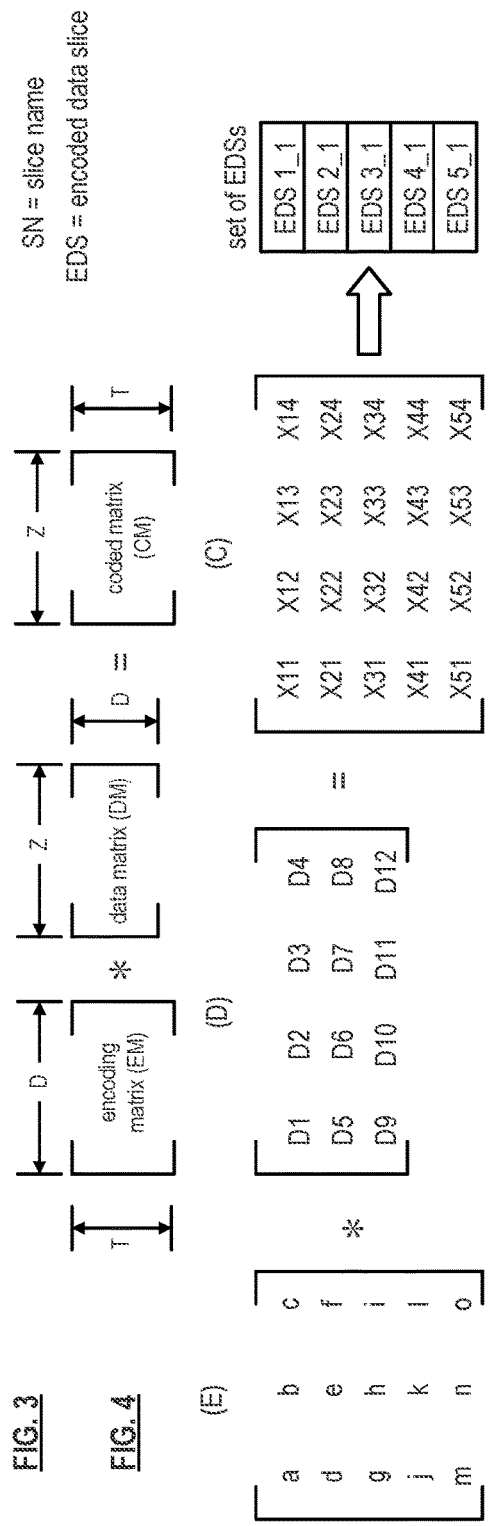
FIG. 3
FIG. 4
FIG. 5
FIG. 6

| source name |
|---|
| B530 | directory file

| file name | source name | extended data |
|---|---|---|
| /pic.jpg | B673 | 329d |
| /file.doc | 79A5 | a302 |
| /lists | 90DE | fb79 |
| /spot.gif | 820C | de55 |
| /papers | D7B9 | 3244 |
| /shipping.doc | 2A45 | a30f |
| /outline.pdf | 49BC | bc88 |
| /stuff.ppt | 39FA | d433 |

| source name |
|---|
| B530 | parent directory file

| index | file name | source name | extended data |
|---|---|---|---|
| 1 | /pic.jpg | B673 | 329d |
| - | /a | B531 | 3467 |
| 5 | /papers | D7B9 | 3244 |
| - | /b | B532 | ab39 |

| source name |
|---|
| B531 | child directory file

| index | file name | source name | extended data |
|---|---|---|---|
| 2 | /file.doc | 79A5 | a302 |
| 3 | /lists | 90DE | fb79 |
| 4 | /spot.gif | 820C | de55 |

| source name |
|---|
| B532 | child directory file

| index | file name | source name | extended data |
|---|---|---|---|
| 6 | /shipping.doc | 2A45 | a30f |
| 7 | /outline.pdf | 49BC | bc88 |
| 8 | /stuff.ppt | 39FA | d433 |

US 10,514,971 B2

DISPERSED B-TREE DIRECTORY TREES

CROSS REFERENCE TO RELATED PATENTS

The present U.S. Utility patent application claims priority pursuant to 35 U.S.C. § 120, as a continuation of U.S. Utility patent application Ser. No. 16/047,637, entitled "DISPERSED B-TREE DIRECTORY TREES," filed Jul. 27, 2018, pending, which claims priority pursuant to 35 U.S.C. § 120, as a continuation-in-part (CIP) of U.S. Utility patent application Ser. No. 13/372,748, entitled "SHARING AND UPDATING A GLOBAL DIRECTORY OF A DISPERSED STORAGE NETWORK," filed Feb. 14, 2012, now abandoned, which claims priority pursuant to 35 U.S.C. § 119(e) to U.S. Provisional Application No. 61/448,526, entitled "DISPERSED STORAGE NETWORK DIRECTORY SYSTEM UTILIZATION," filed Mar. 2, 2011, all of which are hereby incorporated herein by reference in their entirety and made part of the present U.S. Utility patent application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

Prior art data storage systems maintain information corresponding to the data stored therein so that such information may be used to locate the data stored therein based on requests for that data. The prior art does not provide adequate means by which such information is managed and handled to provided efficient operation of the system.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 10A is a diagram of a directory file structure in accordance with the invention;

FIG. 10B is a diagram of another directory file structure in accordance with the invention.

DETAILED DESCRIPTION OF THE INVENTION

Figure 1:
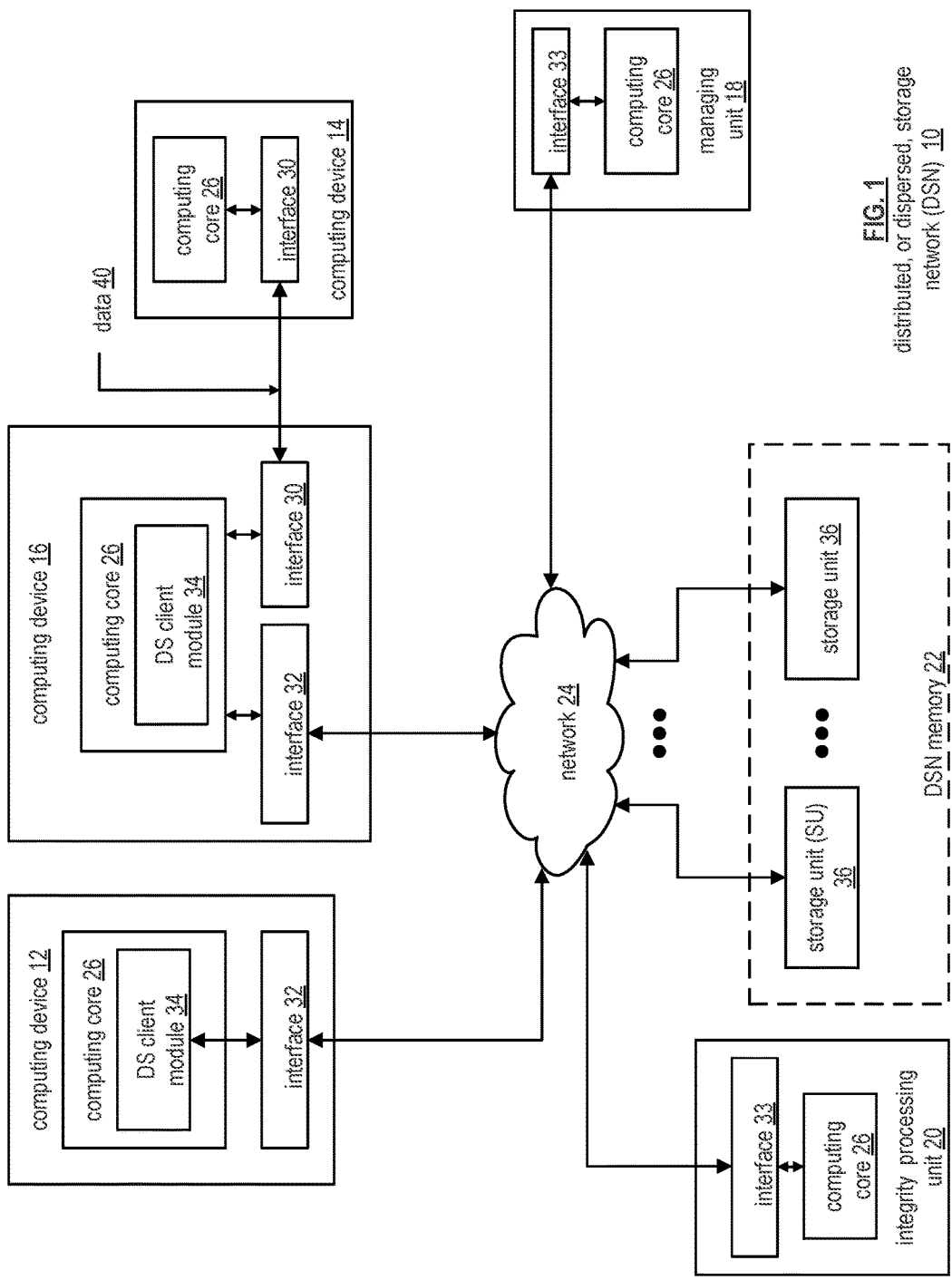
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
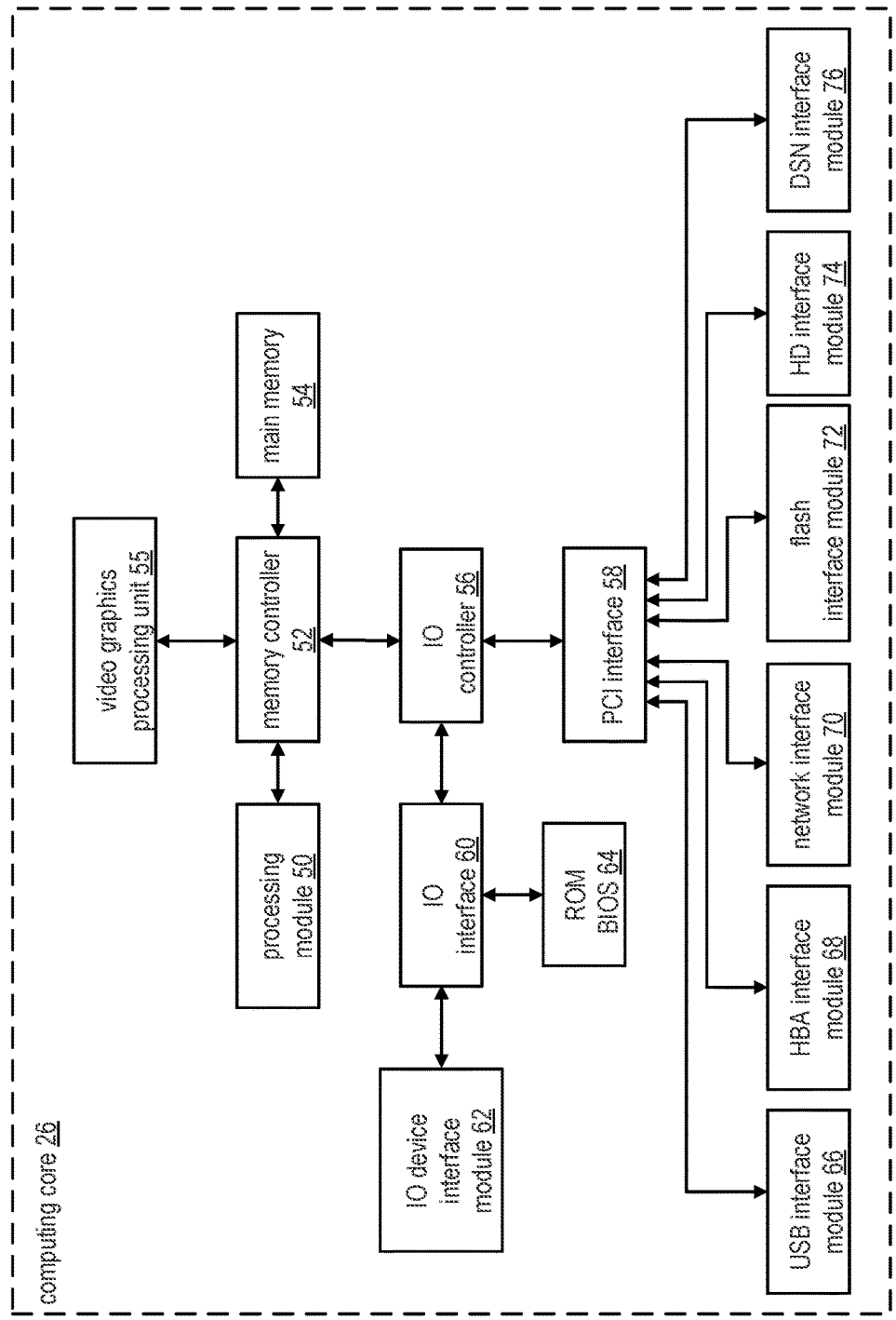
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN module 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
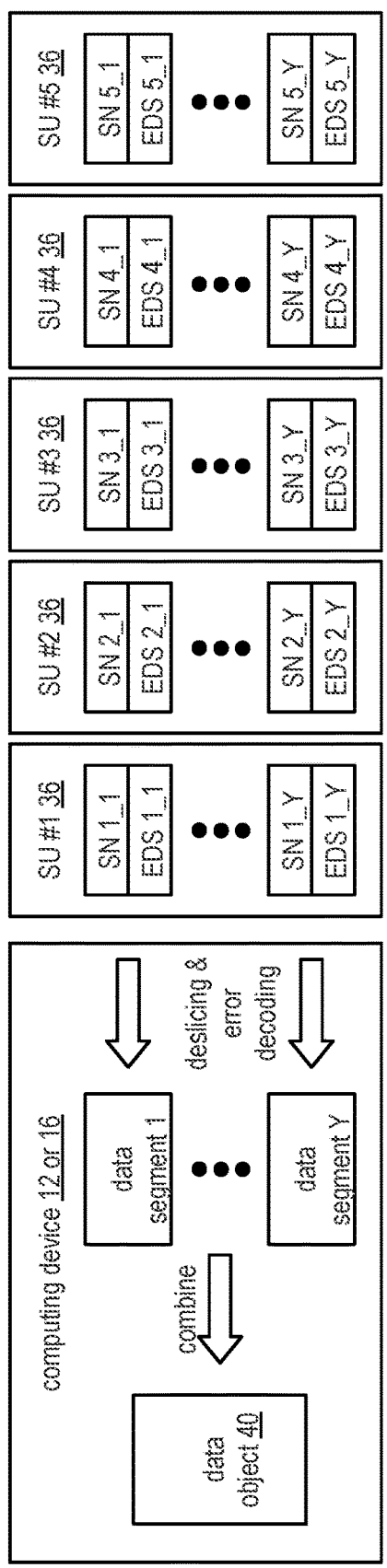
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
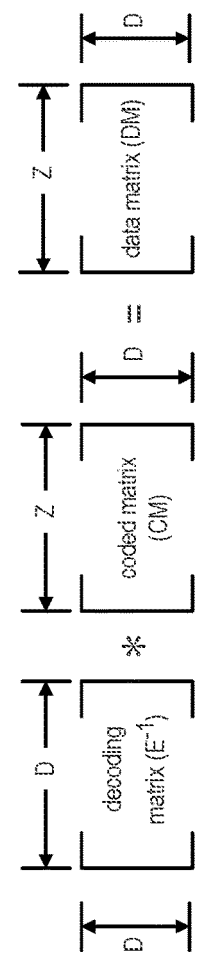
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

In some examples, note that dispersed or distributed storage network (DSN) memory includes one or more of a plurality of storage units (SUs) such as SUs 36 (e.g., that may alternatively be referred to a distributed storage and/or task network (DSTN) module that includes a plurality of distributed storage and/or task (DST) execution units 36 that may be located at geographically different sites (e.g., one in Chicago, one in Milwaukee, etc.). Each of the SUs (e.g., alternatively referred to as DST execution units in some examples) is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

In addition, a computing device (e.g., alternatively referred to as DST processing unit in some examples) is operable to perform various functions, operations, etc. including to generate dispersed error encoded data. In some examples, a computing device is configured to process a data object to generate a plurality of data segments (such that the data object is segmented into a plurality of data segments). Then, the computing device is configured to dispersed error encode the plurality of data segments in accordance with dispersed error encoding parameters to produce sets of encoded data slices (EDSs). In some examples, the computing device is configured to dispersed error encode a data segment of the plurality of data segments in accordance with the dispersed error encoding parameters to produce a set of EDSs. In certain examples, the set of EDSs is distributedly stored in a set of storage units (SUs) within the DSN. That same computing device (and/or another computing device) is configured to retrieve an appropriate number of the set of EDSs (e.g., decode threshold, read threshold, etc.) to reconstruct the data segment in accordance with the dispersed error encoding parameters and/or dispersed error decoding parameters.

Figure 9:
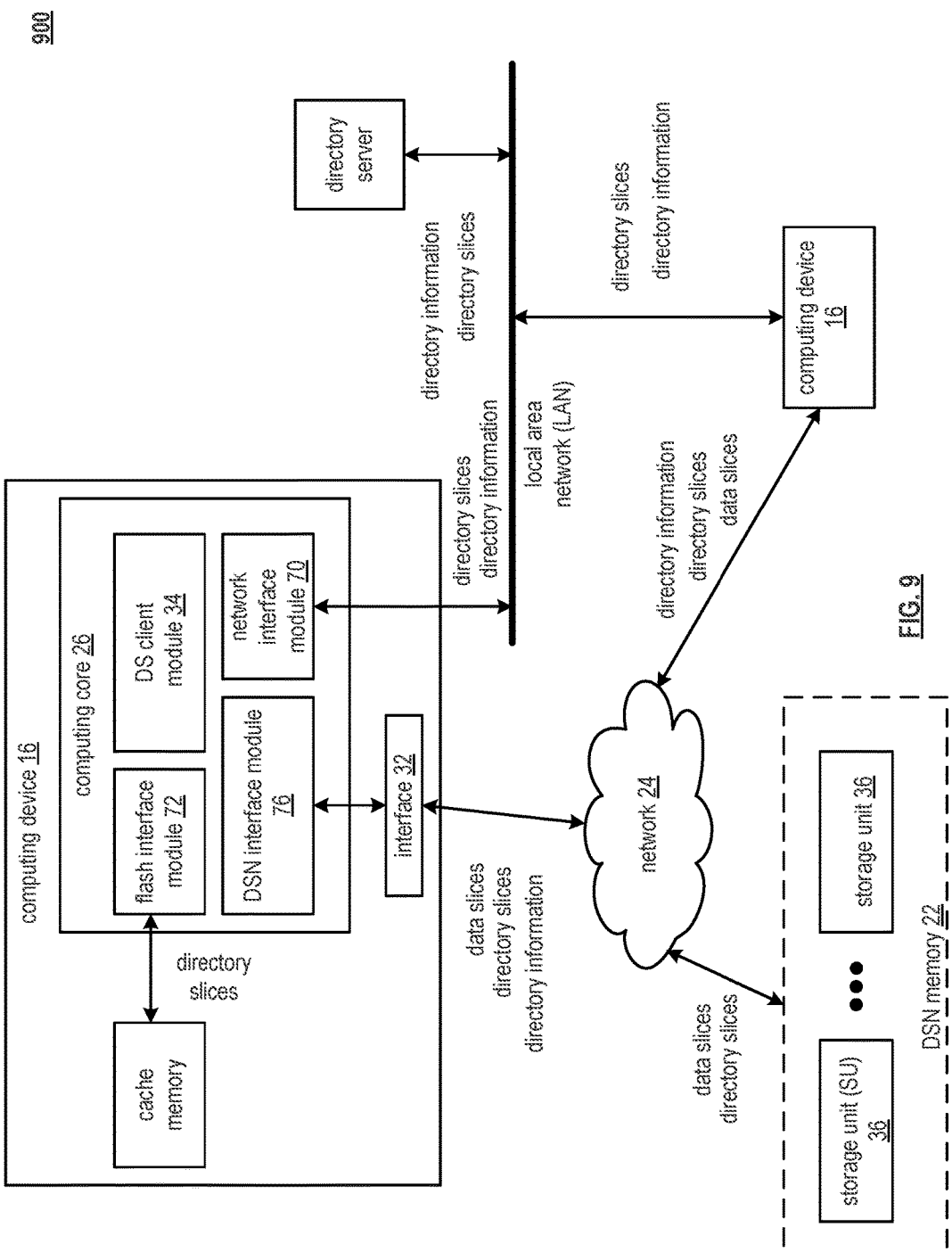
FIG. 9 is a schematic block diagram of another embodiment of a computing system in accordance with the invention.

FIG. 9 is a schematic block diagram 900 of another embodiment of a computing system that includes one or more computing devices 16, a dispersed or distributed storage network (DSN) memory 22, a directory server, a network 24, and a local area network (LAN). Such a LAN may be implemented in accordance with an industry standard to facilitate communications amongst the one or more computing devices 16 and between at least one of the one or more computing devices 16 and the directory server. Each of the computing devices 16 respectively includes a computing core 26, a DSN interface 32, and a cache memory. Such a cache memory may be implemented utilizing one or more of flash memory, dynamic access memory, and a magnetic disk drive. The computing core 26 includes a DS client module 34, a flash interface module 72, a DSN interface module 76, and a network interface module 70. The DSN memory 22 includes a plurality of storage units (SUs) 36.

Such a directory server may include the computing core 26 and memory to facilitate storage of one or more of directory information and directory slices. Such directory information may include one or more of a filename, a source name associated with the filename, a vault identifier (ID), a generation ID, an object number associated with the file name, a timestamp, an open/completed update status indicator, extended data (e.g., a snapshot ID, a size indicator, a segment allocation table vault source name, a content portion), and an operation indicator (e.g., add modify, delete). Such directory slices may be generated when a directory file associated with the directory information is dispersed storage error encoded producing directory slices.

The DS client module 34 dispersed storage error encodes data to produce a plurality of sets of encoded data slices. The computing core 26 outputs the plurality of sets of encoded data slices via the DSN interface module 76 and the computing devices 16 outputs the plurality of sets of encoded data slices via the DSN interface 32 to send the plurality of sets of encoded data slices as data slices via the network 24 to the DSN memory 22 for storage therein.

The DS client module 34 generates a directory file to include directory information associated with the data. The DS client module 34 dispersed storage error encodes the directory file to produce directory slices. The DS client module 34 determines one or more locations (e.g., the cache memory, the directory server, the DSN memory) to store the directory slices. Such a determination may be based on one or more of an access type (e.g., write, modify, delete), a performance requirement, a DSN performance indicator, a predetermination, a lookup, a message, and a command. For example, the DS client module 34 determines to store the directory slices in the cache memory when the performance requirement indicates a low access latency requirement.

The DS client module 34 stores the directory slices at the one or more locations. For example, the computing core 26 outputs the directory slices via the flash interface module 72 to the cache memory for storage therein when the directory slices are to be stored in the cache memory. As another example, the computing core 26 outputs the directory slices via the network interface module 70 the LAN for transfer to the directory server when the directory slices are to be stored in the directory server. As yet another example, the computing core 26 outputs the directory slices via the DSN interface module 76, the computing devices 16 outputs the directory slices via the DSN interface 32, and the network 24 communicates the directory slices to the DSN memory 22. Such directory slices may be stored utilizing a block vault approach, wherein directory slices of a same pillar are stored in a common file. For example, pillar 3 directory slices are stored in a pillar 3 directory slice file in a third SU 36 of the DSN memory 22 when the block vault approach is utilized.

The computing device 16 shares the directory information with at least one other computing devices 16 of the one or more computing devices 16. For example, a first computing device 16 generates the directory information to include an open/completed status update indicator that indicates an open status and sends the directory information via the network 24 and/or the LAN to a second computing device 16 when the first computing device 16 initiates a sequence to generate and store encoded data slices. The second computing device 16 receives the directory information and determines that the open/completed status update indicator indicates the open status. The second computing device 16 waits for subsequent directory information from the first computing device 16 to indicate a completed status before initiating a second sequence to generate and store encoded data slices corresponding to a directory file associated with the directory information. Alternatively, the first computing device 16 sends the directory information via the LAN to the directory server for storage therein. In such a scenario, the second computing device 16 retrieves the directory information via the LAN from the directory server.

In an example of operation and implementation, a computing device includes an interface configured to interface and communicate with a dispersed or distributed storage network (DSN), a memory that stores operational instructions, and a processing module, processor, and/or processing circuitry operably coupled to the interface and memory. The processing module, processor, and/or processing circuitry is configured to execute the operational instructions to perform various operations, functions, etc. In some examples, the processing module, processor, and/or processing circuitry, when operable within the computing device based on the operational instructions, is configured to perform various operations, functions, etc. In certain examples, the processing module, processor, and/or processing circuitry, when operable within the computing device is configured to perform one or more functions that may include generation of one or more signals, processing of one or more signals, receiving of one or more signals, transmission of one or more signals, interpreting of one or more signals, etc. and/or any other operations as described herein and/or their equivalents.

In an example of operation and implementation, a storage unit (SU) includes an interface configured to interface and communicate with a dispersed or distributed storage network (DSN), a memory that stores operational instructions, and a processing module, processor, and/or processing circuitry operably coupled to the interface and memory. The processing module, processor, and/or processing circuitry is configured to execute the operational instructions to perform various operations, functions, etc. In some examples, the processing module, processor, and/or processing circuitry, when operable within the SU based on the operational instructions, is configured to perform various operations, functions, etc. in certain examples, the processing module, processor, and/or processing circuitry, when operable within the SU is configured to perform one or more functions that may include generation of one or more signals, processing of one or more signals, receiving of one or more signals, transmission of one or more signals, interpreting of one or more signals, etc. and/or any other operations as described herein and/or their equivalents.

In an example of operation and implementation, a computing device (e.g., computing device 16 of FIG. 1, FIG. 9, and/or any other diagram, example, embodiment, equivalent, etc. as described herein) is configured to obtain (e.g., via the DSN and via the interface) directory metrics associated with a directory structure that is associated with a directory file that is segmented into a plurality of data segments. Note that a data segment of the plurality of data segments is dispersed error encoded in accordance with dispersed error encoding parameters to produce a set of encoded directory slices that are stored in at least one DSN memory at least one DSN address corresponding to a source name of the directory file.

The computing device is configured to determine whether to reconfigure the directory structure based on the directory metrics. Based on a determination to reconfigure the directory structure based on the directory metrics, the computing device is configured to determine a number of layers for a reconfigured directory structure. The computing device is also configured to determine a number of spans per layer of the number of layers for the reconfigured directory structure. The computing device is also configured to determine directory entry reassignments. Also, the computing device is configured to reconfigure the directory structure based on the number of layers, the spans per layer, and the directory entry reassignments to generate the reconfigured directory structure including at least one of to create one or more children directory files, facilitate movement within the DSN of one or more directory entries from a parent directory file to the one or more children directory files, or to add pointers associated with the one or more children directory files to the parent directory file.

In some examples, the directory metrics includes at least one of a directory size indicator, a number of entries indicator, an access contention indicator, a DSN access performance level indicator, and/or a vault identifier (ID).

In other examples, the computing device is also configured to obtain (e.g., via the DSN and via the interface) the directory metrics associated with the directory structure based on at least one of receiving the directory metrics, a query, and/or a lookup.

In yet other examples, the computing device is also configured to determine the number of layers for the reconfigured directory structure based on at least one of the directory metrics, an estimated performance level, a DSN access performance level goal, and/or a directory metrics goal.

In some examples, the computing device is also configured to determine the number of spans per layer of the number of layers for the reconfigured directory structure based on at least one of the directory metrics, the number of layers, a DSN network bandwidth capacity indicator, a DSN network bandwidth utilization indicator, and/or a DSN network bandwidth utilization goal.

In some examples, the computing device is also configured to determine the directory entry reassignments based on at least one of a number of entries, the directory metrics, the number of layers, the spans per layer, one or more file IDs, an estimated frequency of access associated with a file ID, and/or a data type indicator.

In some examples, with respect to a directory file, the directory file is segmented into a plurality of data segments, and a data segment of the plurality of data segments is dispersed error encoded in accordance with dispersed error encoding parameters to produce a set of encoded directory slices (e.g., in some instances, the set of encoded directory slices are distributedly stored in a plurality of storage units (SUs) within the DSN). In some examples, the set of encoded directory slices is of pillar width. Also, with respect to certain implementations, note that a decode threshold number of encoded directory slices are needed to recover the data segment. Also, a read threshold number of encoded directory slices provides for reconstruction of the data segment. Also, a write threshold number of encoded directory slices provides for a successful transfer of the set of encoded directory slices from a first at least one location in the DSN to a second at least one location in the DSN. In addition, the set of encoded directory slices is of pillar width and includes a pillar number of encoded directory slices. In some examples, each of the decode threshold number, the read threshold number, and the write threshold number is less than the pillar number. Also, in some examples, note that the write threshold number is greater than or equal to the read threshold number that is greater than or equal to the decode threshold number.

In some examples, with respect to a data object, the data object is segmented into a plurality of data segments, and a data segment of the plurality of data segments is dispersed error encoded in accordance with dispersed error encoding parameters to produce a set of encoded data slices (EDSs) (e.g., in some instances, the set of EDSs are distributedly stored in a plurality of storage units (SUs) within the DSN). In some examples, the set of EDSs is of pillar width. Also, with respect to certain implementations, note that the decode threshold number of EDSs are needed to recover the data segment, and a read threshold number of EDSs provides for reconstruction of the data segment. Also, a write threshold number of EDSs provides for a successful transfer of the set of EDSs from a first at least one location in the DSN to a second at least one location in the DSN. The set of EDSs is of pillar width and includes a pillar number of EDSs. Also, in some examples, each of the decode threshold, the read threshold, and the write threshold is less than the pillar number. Also, in some particular examples, the write threshold number is greater than or equal to the read threshold number that is greater than or equal to the decode threshold number.

Note that the computing device as described herein may be located at a first premises that is remotely located from a second premises associated with at least one other SU, dispersed storage (DS) unit, computing device, at least one SU of a plurality of SUs within the DSN (e.g., such as a plurality of SUs that are implemented to store distributedly a set of EDSs), etc. In addition, note that such a computing device as described herein may be implemented as any of a number of different devices including a managing unit that is remotely located from another SU, DS unit, computing device, etc. within the DSN and/or other device within the DSN, an integrity processing unit that is remotely located from another computing device and/or other device within the DSN, a scheduling unit that is remotely located from another computing device and/or SU within the DSN, and/or other device. Also, note that such a computing device as described herein may be of any of a variety of types of devices as described herein and/or their equivalents including a DS unit and/or SU included within any group and/or set of DS units and/or SUs within the DSN, a wireless smart phone, a laptop, a tablet, a personal computers (PC), a work station, and/or a video game device, and/or any type of computing device or communication device. Also, note also that the DSN may be implemented to include and/or be based on any of a number of different types of communication systems including a wireless communication system, a wire lined communication system, a non-public intranet system, a public internet system, a local area network (LAN), and/or a wide area network (WAN). Also, in some examples, any device configured to support communications within such a DSN may be also be configured to and/or specifically implemented to support communications within a satellite communication system, a wireless communication system, a wired communication system, a fiber-optic communication system, and/or a mobile communication system (and/or any other type of communication system implemented using any type of communication medium or media).

Also, note that the storage unit (SU) as described herein may be located at a first premises that is remotely located from a second premises associated with at least one other SU, dispersed storage (DS) unit, computing device, at least one SU of a plurality of SUs within the DSN (e.g., such as a plurality of SUs that are implemented to store distributedly a set of EDSs), etc. In addition, note that such a SU as described herein may be implemented as any of a number of different devices including a managing unit that is remotely located from another SU, DS unit, computing device, etc. within the DSN and/or other device within the DSN, an integrity processing unit that is remotely located from another computing device and/or other device within the DSN, a scheduling unit that is remotely located from another computing device and/or SU within the DSN, and/or other device. Also, note that such a SU as described herein may be of any of a variety of types of devices as described herein and/or their equivalents including a DS unit and/or SU included within any group and/or set of DS units and/or SUs within the DSN, a wireless smart phone, a laptop, a tablet, a personal computers (PC), a work station, and/or a video game device, and/or any type of computing device or communication device. Also, note also that the DSN may be implemented to include and/or be based on any of a number of different types of communication systems including a wireless communication system, a wire lined communication system, a non-public intranet system, a public internet system, a local area network (LAN), and/or a wide area network (WAN). Also, in some examples, any device configured to support communications within such a DSN may be also be configured to and/or specifically implemented to support communications within a satellite communication system, a wireless communication system, a wired communication system, a fiber-optic communication system, and/or a mobile communication system (and/or any other type of communication system implemented using any type of communication medium or media).

FIG. 10A is a diagram 1001 of a directory file structure of a directory file that includes one or more directory file entries associating one or more file names to one or more source names. Such a directory file may include any number of the one or more directory file entries. Such a directory file structure includes a filename field, a source name field, and an extended data field. Such a directory file is dispersed storage error encoded to produce a plurality of sets of encoded directory slices that are stored in a dispersed storage network (DSN) memory at a DSN address corresponding to a source name of the directory file. For example, the directory file is stored in the DSN memory at source name B530.

Such a filename field includes a file system path or a file system file name. For example, the filename field includes a filename of /pic.jpg when a corresponding directory file entry describes an associated file system file name. Such a source name field includes a source name of the corresponding directory file entry indicating where (e.g., source name DSN address) encoded data slices associated with the directory file entry are stored. For example, a file with a filename of /spot.gif is stored as encoded data slices at a source name of 820C. The extended data field includes extended data associated with the directory file entry.

In a data retrieval example, encoded directory slices associated with the directory file are retrieved via a network 24 from the DSN memory at source name B530. Such retrieving via the network 24 may introduce undesirable network loading when frequent retrievals of the directory file occur and/or when the directory file is quite large. The encoded directory slices are dispersed storage error decoded to produce the directory file. A desired filename (e.g., outline.pdf) is identified within the directory file. The associated source name (e.g., 49 BC) associated with the filename is extracted from the directory file. Encoded data slices associated with data are retrieved from the DSN memory utilizing the source name (e.g., 49 BC).

FIG. 10B is a diagram 1002 of another directory file structure that includes a parent directory file and one or more child directory files. The directory file structure provides substantially the same directory file information as a previous directory file represented in FIG. 10A without retrieving a potentially single large directory file. The parent directory file structure includes an index field, a filename field, a source name field, and an extended data field. Such an index field includes an index number, wherein the index number represents a sorting order of an associated directory file entry that corresponds to a directory file sorting order prior to a restructuring. For example, a parent directory file entry associated with filename /pic.jpg is associated with an index number of 1 when the filename /pic.jpg is associated with an index number of 1 from an associated directory file (e.g., of FIG. 10A) prior to restructuring.

Directory file entries of the previous directory file are represented in the parent directory file (e.g., /pic.jpg, /papers) except for directory file entries pushed into one or more of the child directory files as a result of the restructuring. For example, a first child directory file stored at source name B531 includes directory file entries /file.doc, /lists, and /spot.gif, and a second child directory file stored at source name B532 includes directory file entries /shipping.doc, outline.pdf, and /stuff.ppt.

In a data retrieval example of file spot.gif associated with index 4, encoded directory slices associated with the parent directory file are retrieved via a network 24 from the DSN memory at source name B530. The encoded directory slices are dispersed storage error decoded to produce the parent directory file. The index field of the parent directory file does not include the index 4. The index field of the parent directory includes indexes 1 and 5. A child directory file /a is referenced between index 1 and index 5 utilizing a source name of B531. Encoded directory slices associated with the child directory file /a are retrieved from the DSN memory at source name B531. A source name of 820C is extracted from the child directory file corresponding to an entry for /spot.gif of index 4. Encoded data slices associated with data are retrieved from the DSN memory utilizing the source name (e.g., 820C). The encoded data slices are dispersed storage error decoded to produce data of spot.gif.

Such restructuring of a directory file into a parent directory file and one or more child directory files may include any number of child directory files (e.g., any span width) and any number of levels, wherein a child directory file is further restructured into one or more child directory files. A child directory file may include any number of entries. A method to determine a span width per level, a number of entries per child directory file, and a number of levels of child directory files is discussed in greater detail with reference to FIG. 11.

Figure 11:
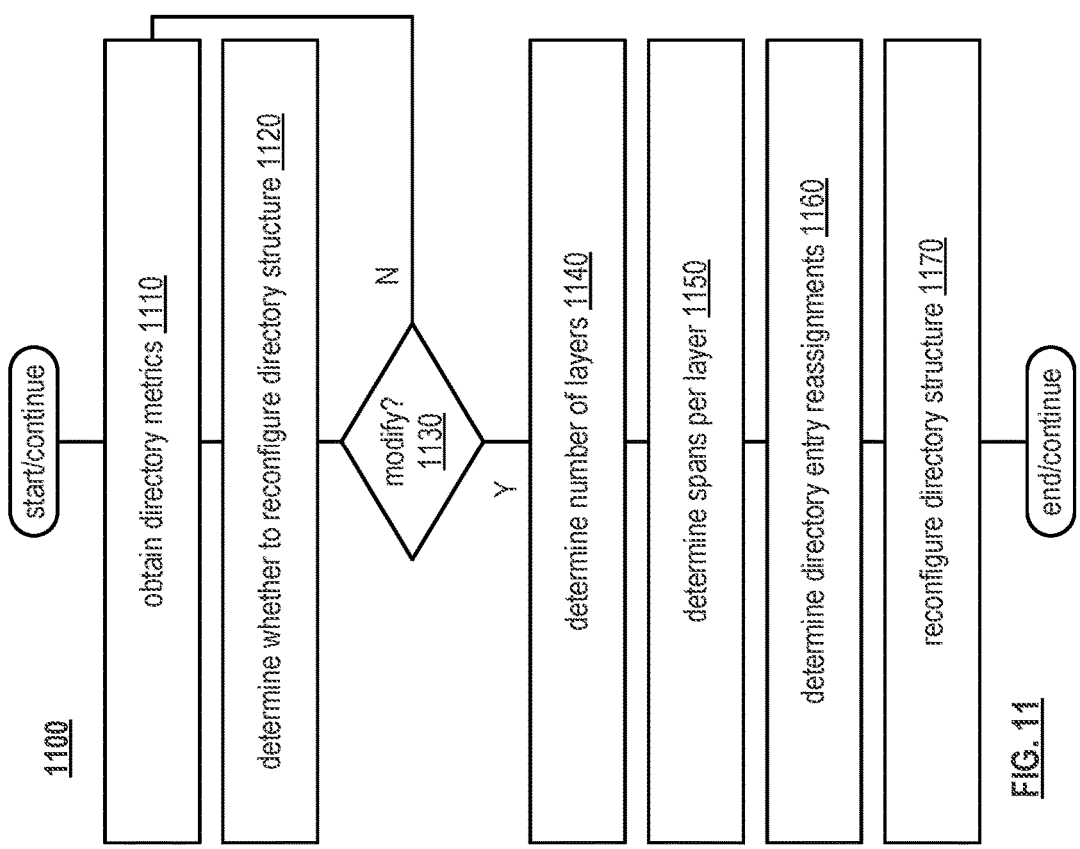
FIG. 11 is a flowchart illustrating an example of reconfiguring a directory file structure in accordance with the invention.

FIG. 11 is a flowchart illustrating an example of reconfiguring a directory file structure. The method 1100 begins with the step 1110 where a processing module obtains directory metrics associated with a directory structure. Note that any reference to any step of the method 1100 described as being performed by a processing module herein may at least one and/or alternatively be performed by a processor, processing circuitry, a computing device, and/or other one or more components, devices, etc. Such directory metrics includes one or more of a directory size indicator, a number of entries indicator, an access contention indicator, a dispersed storage network (DSN) access performance level indicator, and a vault identifier (ID). Such obtaining may be based on one or more of receiving the directory metrics, a query, and a lookup.

The method 1100 continues at the step 1120 where the processing module determines whether to reconfigure the directory structure based on the directory metrics. For example, the processing module determines to reconfigure the directory structure when the number of entries indicator is greater than an entries threshold level. As another example, the processing module determines to reconfigure the directory structure when the access contention indicator indicates unfavorable contention. For instance, more than a threshold number of access requests per unit of time are received for the directory structure. The method 1100 repeats back to the step 1110 where the processing module obtains the directory metrics when the processing module determines not to reconfigure the directory structure (per step 1130). The method 1100 continues to the next step 1140 when the processing module determines to reconfigure the directory structure (per step 1130).

The method 1100 continues at the step 1140 where the processing module determines a number of layers for a reconfigured directory structure. Such a determination may be based on one or more of the directory metrics, an estimated performance level, a DSN access performance level goal, and a directory metrics goal. For example, the processing module determines to utilize three layers for the reconfigured directory structure when an estimated performance level corresponding to three layers compares favorably to the DSN access performance level goal.

The method 1100 continues at the step 1150 where the processing module determines a number of spans per layer. Such a determination may be based on one or more of the directory metrics, the number of layers, a DSN network bandwidth capacity indicator, a DSN network bandwidth utilization indicator, and a DSN network bandwidth utilization goal. For example, the processing module determines more spans per layer such that fewer entries result per directory file of a same layer to achieve a DSN network bandwidth goal as retrieval of smaller directory files utilize less DSN network bandwidth capacity.

The method 1100 continues at the step 1160 where the processing module determines directory entry re-assignments. Such a determination may be based on one or more of a number of entries, the directory metrics, the number of layers, the spans per layer, one or more file IDs, an estimated frequency of access associated with a file ID, and a data type indicator. For example, the processing module determines to reassign file ID 3 to a top layer directory file to reduce access latency based on a data type indicator (e.g., a priority indicator) associated with the file ID. As another example, the processing module determines to reassign file ID 7 to a lower layer directory file where increased access latency is acceptable when an estimated frequency of access associated with file ID 7 is lower.

The method 1100 continues at the step 1170 where the processing module reconfigures the directory structure in accordance with the number of layers, the spans per layer, and the directory entry reassignments to produce the reconfigured directory structure. For example, the processing module creates one or more children directory files, moves one or more directory entries from a parent directory file to the one or more children directory files, and adds pointers associated with the one or more children directory files to the parent directory file.

Variants of the method 1100 include a method for execution by a computing device. Variants of such a method 1100 operate by obtaining (e.g., via a dispersed or distributed storage network (DSN) and via an interface of the computing device that is configured to interface and communicate with the DSN) directory metrics associated with a directory structure that is associated with a directory file that is segmented into a plurality of data segments. Note that a data segment of the plurality of data segments is dispersed error encoded in accordance with dispersed error encoding parameters to produce a set of encoded directory slices that are stored in at least one DSN memory at least one DSN address corresponding to a source name of the directory file.

Such variants of the method 1100 also operate by determining whether to reconfigure the directory structure based on the directory metrics.

Also, based on a determination to reconfigure the directory structure based on the directory metrics, such variants of the method 1100 operate by determining a number of layers for a reconfigured directory structure. Such variants of the method 1100 also operate by determining a number of spans per layer of the number of layers for the reconfigured directory structure. Such variants of the method 1100 also operate by determining directory entry reassignments. Such variants of the method 1100 also operate by reconfiguring the directory structure based on the number of layers, the spans per layer, and the directory entry reassignments to generate the reconfigured directory structure including at least one of to create one or more children directory files, facilitate movement within the DSN of one or more directory entries from a parent directory file to the one or more children directory files, or to add pointers associated with the one or more children directory files to the parent directory file.

In some examples, the directory metrics includes at least one of a directory size indicator, a number of entries indicator, an access contention indicator, a DSN access performance level indicator, and/or a vault identifier (ID).

In some examples, variants of the method 1100 also operate by obtaining (e.g., via the DSN and via the interface) the directory metrics associated with the directory structure based on at least one of receiving the directory metrics, a query, or a lookup.

In other examples, variants of the method 1100 also operate by determining the number of layers for the reconfigured directory structure based on at least one of the directory metrics, an estimated performance level, a DSN access performance level goal, and/or a directory metrics goal.

In yet other examples, variants of the method 1100 also operate by determining the number of spans per layer of the number of layers for the reconfigured directory structure based on at least one of the directory metrics, the number of layers, a DSN network bandwidth capacity indicator, a DSN network bandwidth utilization indicator, and/or a DSN network bandwidth utilization goal.

In some examples, variants of the method 1100 also operate by determining the directory entry reassignments based on at least one of a number of entries, the directory metrics, the number of layers, the spans per layer, one or more file IDs, an estimated frequency of access associated with a file ID, and/or a data type indicator.

In some examples, with respect to a directory file, the directory file is segmented into a plurality of data segments, and a data segment of the plurality of data segments is dispersed error encoded in accordance with dispersed error encoding parameters to produce a set of encoded directory slices (e.g., in some instances, the set of encoded directory slices are distributedly stored in a plurality of storage units (SUs) within the DSN). In some examples, the set of encoded directory slices is of pillar width. Also, with respect to certain implementations, note that a decode threshold number of encoded directory slices are needed to recover the data segment. Also, a read threshold number of encoded directory slices provides for reconstruction of the data segment. Also, a write threshold number of encoded directory slices provides for a successful transfer of the set of encoded directory slices from a first at least one location in the DSN to a second at least one location in the DSN. In addition, the set of encoded directory slices is of pillar width and includes a pillar number of encoded directory slices. In some examples, each of the decode threshold number, the read threshold number, and the write threshold number is less than the pillar number. Also, in some examples, note that the write threshold number is greater than or equal to the read threshold number that is greater than or equal to the decode threshold number.

Note that the computing device may be located at a first premises that is remotely located from at least one SU of a plurality of SUs within the DSN. Also, note that the computing device may be of any of a variety of types of devices as described herein and/or their equivalents including a SU of any group and/or set of SUs within the DSN, a wireless smart phone, a laptop, a tablet, a personal computers (PC), a work station, and/or a video game device. Note also that the DSN may be implemented to include or be based on any of a number of different types of communication systems including a wireless communication system, a wire lined communication systems, a non-public intranet system, a public internet system, a local area network (LAN), and/or a wide area network (WAN).

This disclosure presents, among other things, solutions that improve the operation of one or more computing devices, one or more storage units (SUs), and/or other device(s), and/or the dispersed or distributed storage network (DSN). Various aspects, embodiments, and/or examples of the invention are presented herein that effectuate improvement of the efficiency of the one or more computing devices, one or more SUs, and/or other device(s), and/or the DSN, produce concrete and tangible results, improve upon what was previously done with computers, and solve one or more computer specific problems. For example, a new file system is presented herein that effectuates improvement of the efficiency of the one or more computing devices, one or more SUs, and/or other device(s), and/or the DSN, produce concrete and tangible results, improve upon what was previously done with computers, and solve one or more computer specific problems.

A new format for dispersed directory files is presented herein that utilizes multiple directory files arranged in a B-tree data structure for unlimited scalability of the number of files/entries contained within a directory. There will be one top-most, root node for each directory, which can contain some maximum number of entries. When this number is exceeded, the content of the directory file is split such that there are children nodes of the root node, as well as pointers indicating ordering, so that the location of any file or object can be determined quickly in a log(N) number of reads of directory files from the dispersed or distributed storage network (DSN) and/or dsNet.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/− 1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A computing device comprising:
an interface configured to interface and communicate with a dispersed or distributed storage network (DSN);
memory that stores operational instructions; and
processing circuitry operably coupled to the interface and to the memory, wherein the processing circuitry is configured to execute the operational instructions to:
reconfigure, via the interface and via the DSN, a directory structure that is associated with a directory file that is segmented into a plurality of data segments, wherein a data segment of the plurality of data segments is dispersed error encoded in accordance with dispersed error encoding parameters to produce a set of encoded directory slices that are stored in at least one DSN memory of the DSN based on at least one DSN address corresponding to a source name of the directory file, including to:
reconfigure the directory structure based on a number of layers, a number of spans per layer, and directory entry reassignments to generate a reconfigured directory structure including to perform at least one of to create one or more children directory files, to facilitate movement within the DSN of one or more directory entries from a parent directory file to the one or more children directory files, or to add pointers associated with the one or more children directory files to the parent directory file.

2. The computing device of claim 1, wherein the processing circuitry is further configured to execute the operational instructions to:
obtain, via the interface and via the DSN, directory metrics associated with the directory structure that is associated with the directory file;
determine whether to reconfigure the directory structure based on the directory metrics;
based on a determination to reconfigure the directory structure based on the directory metrics:
determine the number of layers for the reconfigured directory structure;
determine the number of spans per layer of the number of layers for the reconfigured directory structure;
determine the directory entry reassignments; and
reconfigure the directory structure based on the number of layers, the number of spans per layer, and the directory entry reassignments to generate the reconfigured directory structure.

3. The computing device of claim 1, wherein:
the processing circuitry is further configured to execute the operational instructions to obtain, via the interface and via the DSN, directory metrics associated with the directory structure that is associated with the directory file;
the directory metrics includes at least one of a directory size indicator, a number of entries indicator, an access contention indicator, a DSN access performance level indicator, or a vault identifier (ID); and
the processing circuitry is further configured to execute the operational instructions to obtain, via the interface and via the DSN, the directory metrics associated with the directory structure based on at least one of receiving the directory metrics, a query, or a lookup.

4. The computing device of claim 1, wherein the processing circuitry is further configured to execute the operational instructions to:
obtain, via the interface and via the DSN, directory metrics associated with the directory structure that is associated with the directory file; and
determine the number of layers for the reconfigured directory structure based on at least one of the directory metrics, an estimated performance level, a DSN access performance level goal, or a directory metrics goal.

5. The computing device of claim 1, wherein the processing circuitry is further configured to execute the operational instructions to:
obtain, via the interface and via the DSN, directory metrics associated with the directory structure that is associated with the directory file; and
determine the number of spans per layer of the number of layers for the reconfigured directory structure based on at least one of the directory metrics, the number of layers, a DSN network bandwidth capacity indicator, a DSN network bandwidth utilization indicator, or a DSN network bandwidth utilization goal.

6. The computing device of claim 1, wherein the processing circuitry is further configured to execute the operational instructions to:
   obtain, via the interface and via the DSN, directory metrics associated with the directory structure that is associated with the directory file; and
   determine the directory entry reassignments based on at least one of a number of entries, the directory metrics, the number of layers, the number of spans per layer, one or more file identifiers (IDs), an estimated frequency of access associated with a file identifier (ID), or a data type indicator.

7. The computing device of claim 1, wherein, based on the dispersed error encoding parameters:
   a decode threshold number of encoded directory slices are needed to recover the data segment;
   a read threshold number of encoded directory slices provides for reconstruction of the data segment;
   a write threshold number of encoded directory slices provides for a successful transfer of the set of encoded directory slices from a first at least one location in the DSN to a second at least one location in the DSN;
   the set of encoded directory slices is of pillar width and includes a pillar number of encoded directory slices;
   each of the decode threshold number, the read threshold number, and the write threshold number is less than the pillar number; and
   the write threshold number is greater than or equal to the read threshold number that is greater than or equal to the decode threshold number.

8. The computing device of claim 1, wherein the DSN includes at least one of a wireless communication system, a wire lined communication system, a non-public intranet system, a public internet system, a local area network (LAN), or a wide area network (WAN).

9. A computing device comprising:
   an interface configured to interface and communicate with a dispersed or distributed storage network (DSN);
   memory that stores operational instructions; and
   processing circuitry operably coupled to the interface and to the memory, wherein the processing circuitry is configured to execute the operational instructions to:
      obtain, via the interface and via the DSN, directory metrics associated with a directory structure that is associated with a directory file based on at least one of receiving the directory metrics, a query, or a lookup; and
      reconfigure, via the interface and via the DSN, the directory structure that is associated with the directory file, wherein the directory file is segmented into a plurality of data segments, wherein a data segment of the plurality of data segments is dispersed error encoded in accordance with dispersed error encoding parameters to produce a set of encoded directory slices that are stored in at least one DSN memory of the DSN based on at least one DSN address corresponding to a source name of the directory file, wherein a decode threshold number of encoded directory slices are needed to recover the data segment, including to:
         reconfigure the directory structure based on a number of layers, a number of spans per layer, and directory entry reassignments to generate a reconfigured directory structure including to perform at least one of to create one or more children directory files, to facilitate movement within the DSN of one or more directory entries from a parent directory file to the one or more children directory files, or to add pointers associated with the one or more children directory files to the parent directory file.

10. The computing device of claim 9, wherein the processing circuitry is further configured to execute the operational instructions to:
    determine whether to reconfigure the directory structure based on the directory metrics;
    based on a determination to reconfigure the directory structure based on the directory metrics:
       determine the number of layers for the reconfigured directory structure;
       determine the number of spans per layer of the number of layers for the reconfigured directory structure;
       determine the directory entry reassignments; and
       reconfigure the directory structure based on the number of layers, the number of spans per layer, and the directory entry reassignments to generate the reconfigured directory structure.

11. The computing device of claim 9, wherein the processing circuitry is further configured to execute the operational instructions to perform at least one of to:
    determine the number of layers for the reconfigured directory structure based on at least one of the directory metrics, an estimated performance level, a DSN access performance level goal, or a directory metrics goal;
    determine the number of spans per layer of the number of layers for the reconfigured directory structure based on at least one of the directory metrics, the number of layers, a DSN network bandwidth capacity indicator, a DSN network bandwidth utilization indicator, or a DSN network bandwidth utilization goal; or
    determine the directory entry reassignments based on at least one of a number of entries, the directory metrics, the number of layers, the number of spans per layer, one or more file identifiers (IDs), an estimated frequency of access associated with a file identifier (ID), or a data type indicator.

12. The computing device of claim 9, wherein, based on the dispersed error encoding parameters:
    a read threshold number of encoded directory slices provides for reconstruction of the data segment;
    a write threshold number of encoded directory slices provides for a successful transfer of the set of encoded directory slices from a first at least one location in the DSN to a second at least one location in the DSN;
    the set of encoded directory slices is of pillar width and includes a pillar number of encoded directory slices;
    each of the decode threshold number, the read threshold number, and the write threshold number is less than the pillar number; and
    the write threshold number is greater than or equal to the read threshold number that is greater than or equal to the decode threshold number.

13. The computing device of claim 9, wherein the DSN includes at least one of a wireless communication system, a wire lined communication system, a non-public intranet system, a public internet system, a local area network (LAN), or a wide area network (WAN).

14. A method for execution by a computing device, the method comprising:
    reconfiguring, via an interface of the computing device that is configured to interface and communicate with a dispersed or distributed storage network (DSN) and via the DSN, a directory structure that is associated with a directory file that is segmented into a plurality of data segments, wherein a data segment of the plurality of data segments is dispersed error encoded in accordance with dispersed error encoding parameters to produce a set of encoded directory slices that are stored in at least one DSN memory of the DSN based on at least one DSN address corresponding to a source name of the directory file, including:

reconfiguring the directory structure based on a number of layers, a number of spans per layer, and directory entry reassignments to generate a reconfigured directory structure including performing at least one of creating one or more children directory files, facilitating movement within the DSN of one or more directory entries from a parent directory file to the one or more children directory files, or adding pointers associated with the one or more children directory files to the parent directory file.

15. The method of claim 14 further comprising:
obtaining, via the interface and via the DSN, directory metrics associated with the directory structure that is associated with the directory file;
determining whether to reconfigure the directory structure based on the directory metrics;
based on a determination to reconfigure the directory structure based on the directory metrics:
   determining the number of layers for the reconfigured directory structure;
   determining the number of spans per layer of the number of layers for the reconfigured directory structure;
   determining the directory entry reassignments; and
   reconfiguring the directory structure based on the number of layers, the number of spans per layer, and the directory entry reassignments to generate the reconfigured directory structure.

16. The method of claim 14 further comprising:
obtaining, via the interface and via the DSN, directory metrics associated with the directory structure that is associated with the directory file, wherein the directory metrics includes at least one of a directory size indicator, a number of entries indicator, an access contention indicator, a DSN access performance level indicator, or a vault identifier (ID); and
obtaining, via the interface and via the DSN, the directory metrics associated with the directory structure based on at least one of receiving the directory metrics, a query, or a lookup.

17. The method of claim 14 further comprising:
obtaining, via the interface and via the DSN, directory metrics associated with the directory structure that is associated with the directory file; and
determining the number of layers for the reconfigured directory structure based on at least one of the directory metrics, an estimated performance level, a DSN access performance level goal, or a directory metrics goal; and
determining the number of spans per layer of the number of layers for the reconfigured directory structure based on at least one of the directory metrics, the number of layers, a DSN network bandwidth capacity indicator, a DSN network bandwidth utilization indicator, or a DSN network bandwidth utilization goal.

18. The method of claim 14 further comprising:
obtaining, via the interface and via the DSN, directory metrics associated with the directory structure that is associated with the directory file; and
determining the directory entry reassignments based on at least one of a number of entries, the directory metrics, the number of layers, the number of spans per layer, one or more file identifiers (IDs), an estimated frequency of access associated with a file identifier (ID), or a data type indicator.

19. The method of claim 14, wherein, based on the dispersed error encoding parameters:
a decode threshold number of encoded directory slices are needed to recover the data segment;
a read threshold number of encoded directory slices provides for reconstruction of the data segment;
a write threshold number of encoded directory slices provides for a successful transfer of the set of encoded directory slices from a first at least one location in the DSN to a second at least one location in the DSN;
the set of encoded directory slices is of pillar width and includes a pillar number of encoded directory slices;
each of the decode threshold number, the read threshold number, and the write threshold number is less than the pillar number; and
the write threshold number is greater than or equal to the read threshold number that is greater than or equal to the decode threshold number.

20. The method of claim 14, wherein the DSN includes at least one of a wireless communication system, a wire lined communication system, a non-public intranet system, a public internet system, a local area network (LAN), or a wide area network (WAN).

* * * * *